United States Patent [19]

Volk

[11] Patent Number: 5,451,182

[45] Date of Patent: Sep. 19, 1995

[54] POULTRY TRUSSING DEVICE WITH PROTECTIVE CAP

[76] Inventor: Henry J. Volk, 1863 Anning Dr., Turlock, Calif. 95382

[21] Appl. No.: 384,406

[22] Filed: Feb. 6, 1995

[51] Int. Cl.6 .............................................. A22C 21/00
[52] U.S. Cl. ..................................... 452/174; 452/176
[58] Field of Search .................. 452/174, 176, 198, 11

[56] References Cited

U.S. PATENT DOCUMENTS

| | | | |
|---|---|---|---|
| 3,895,415 | 7/1975 | Volk | 452/174 |
| 4,615,075 | 10/1986 | Volk | 452/174 |
| 5,102,370 | 4/1992 | Volk | 452/176 |
| 5,112,274 | 5/1992 | Volk | 452/176 |
| 5,181,880 | 1/1993 | Volk | 452/176 |
| 5,380,241 | 1/1995 | Volk | 452/176 |

*Primary Examiner*—Willis Little

[57] ABSTRACT

A poultry trussing device is provided having a protective cap which holds together and covers the exposed hocks. The protective cap forms a smooth three-dimensional continuous surface which grips and encloses the hocks. The cap is connected to an anchor which is removably attached to the side portion of the backbone of the carcass.

5 Claims, 3 Drawing Sheets

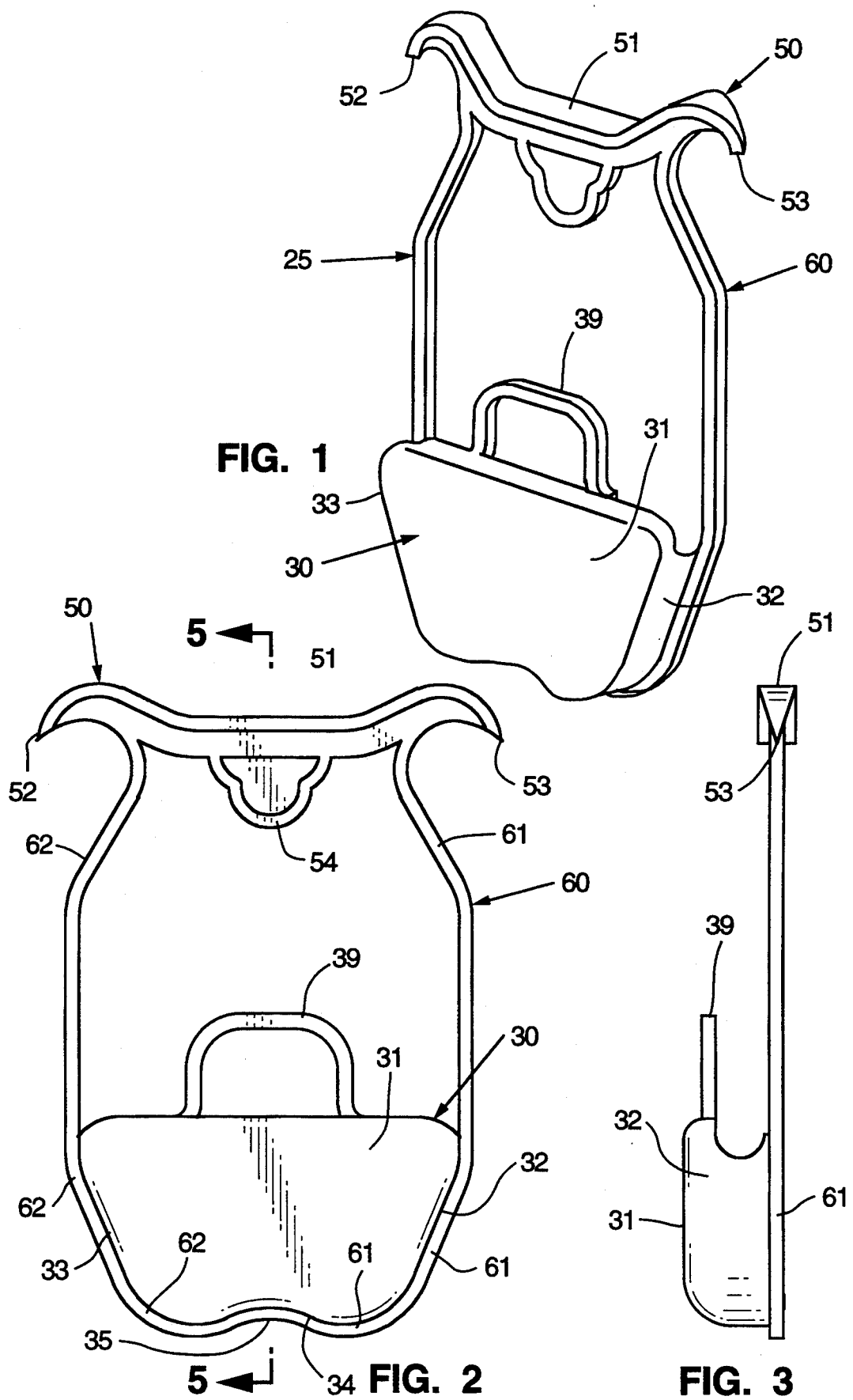

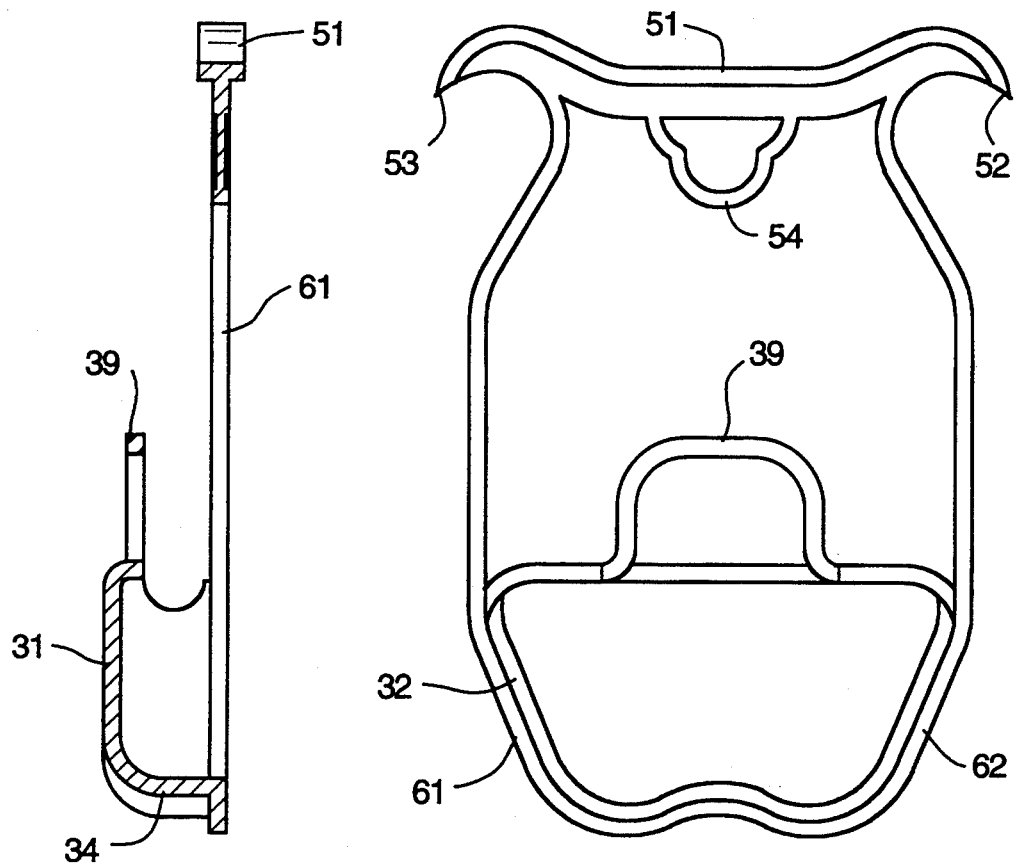
FIG. 5
FIG. 4
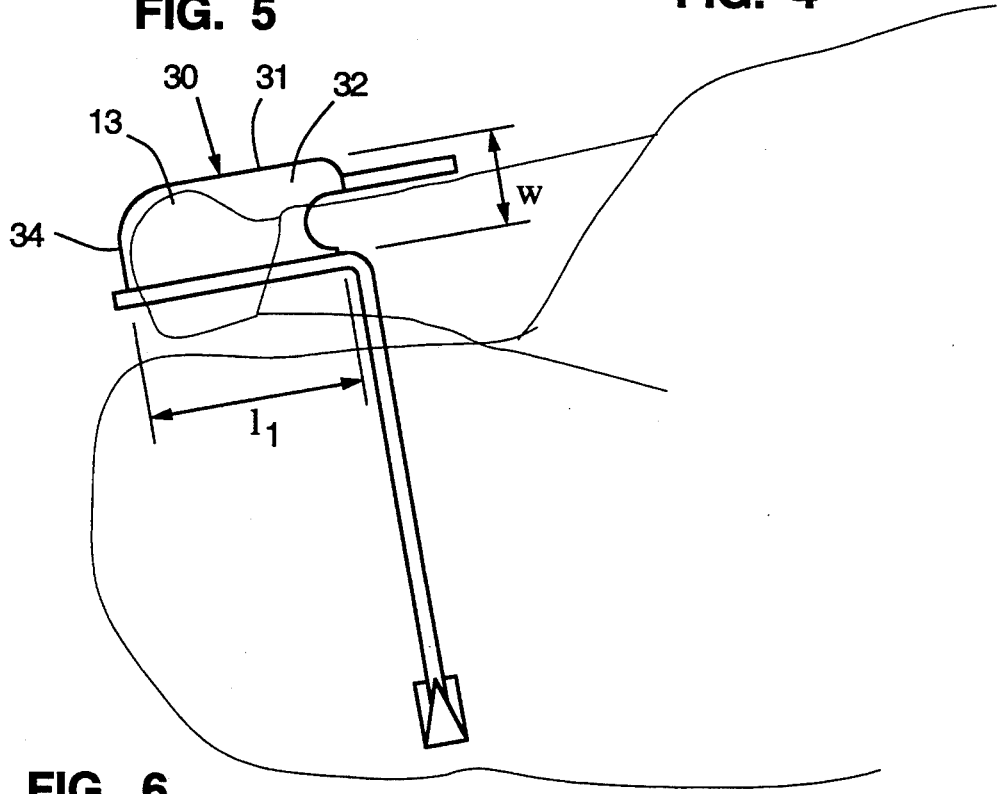
FIG. 6

POULTRY TRUSSING DEVICE WITH PROTECTIVE CAP

BACKGROUND OF THE INVENTION

This invention relates to trussing devices for dressed poultry, and more particularly, to a trussing device for use in the commercial processing of dressed and eviscerated turkey carcasses.

Prior art poultry trussing devices include the wire retainer shown in U.S. Pat. No. 3,112,515 dated Dec. 3, 1963. The prior art also includes various plastic trussing devices such as U.S. Pat. No. 4,615,075 dated Oct. 7, 1986 and U.S. Pat. No. 4,653,146 dated Mar. 31, 1987 and U.S. Pat. No. 4,739,538 dated Apr. 26, 1988. The last three patents identified teach plastic retainers having various arrays of resilient and flexible straps which are intended to fit about and across the exposed hocks. The straps of those patents are of a rather convoluted design to permit them to be deformed so as to resiliently fit about and across the exposed hocks.

BRIEF SUMMARY OF THE INVENTION

In accordance with the present invention, a trussing device is provided having a protective cap which forms a smooth three-dimensional continuous surface for gripping and covering the exposed hocks. There are several advantages of the design of the present invention over the prior art.

The present design avoids the use of straps having a complex or convoluted configuration which must be placed precisely in position to properly retain the exposed hocks. The present invention provides a single protective cap which simply holds together and covers the exposed hocks.

Secondly, according to the present invention, a protective cap is provided having a smooth surface which covers the exposed hocks and prevents any sharp edges of the exposed hocks from puncturing the plastic covering typically used to enclose the carcass by shrink wrapping.

Accordingly, it is a primary object of the present invention to provide a poultry trussing device which utilizes a single protective cap to hold together and cover the exposed hocks, avoiding the requirement of placing straps precisely in position to retain the hocks together.

A further object of the invention is to provide a poultry trussing device which prevents sharp edges of the exposed hocks from puncturing a package for the carcass such as shrunk wrap plastic.

Other objects and advantages of the invention will become apparent from the following description of the preferred embodiment and the drawings wherein

BRIEF DESCRIPTION OF THE DRAWINGS

FIG. 1 is a perspective view of the trussing device of the present invention;

FIG. 2 is a front elevational view of the trussing device of the present invention;

FIG. 3 is a side elevational view of the trussing device according to the present invention;

FIG. 4 is a back elevational view showing the reverse side of the trussing device as compared to the view of FIG. 2;

FIG. 5 is a section on the line 5—5 of FIG. 2;

FIG. 6 is a schematic representation showing a side view of the trussing device of the present invention as applied to a turkey carcass;

DETAILED DESCRIPTION OF THE DRAWINGS

Figure 7:
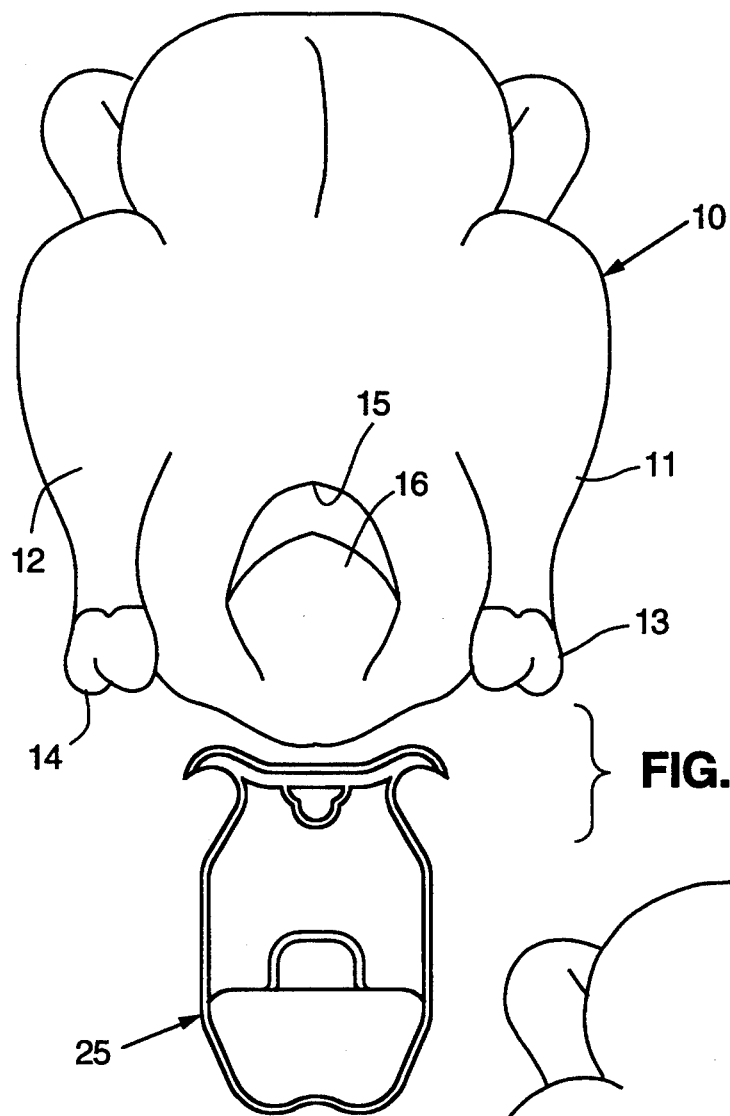
FIG. 7 is a perspective view of an eviscerated turkey carcass as the retainer of the present invention is about to be applied.
Figure 8:
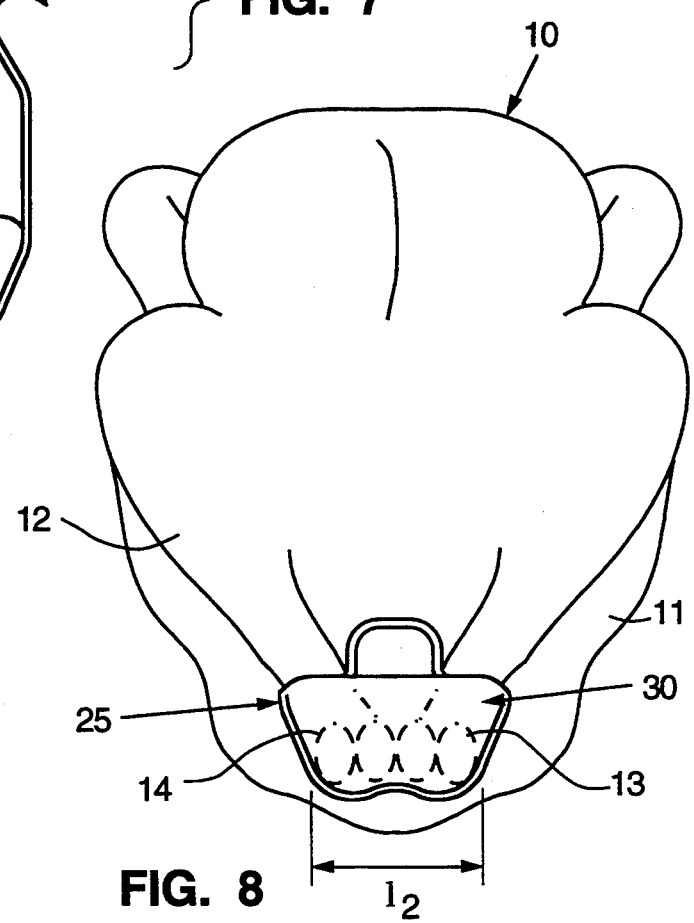
FIG. 8 is a perspective view of a dressed and eviscerated turkey carcass after the trussing device of the present invention has been applied.

As shown best in FIG. 7, an eviscerated turkey carcass shown generally as 10 is ready to have the trussing device shown generally as 25 of the present invention applied. After the trussing device 25 is applied, the trussed carcass 10 appears as shown in FIG. 8. The carcass 10 has legs 11 and 12 which terminate in exposed hocks 13 and 14 after the feet have been cut off from the carcass. The abdominal cavity of the carcass is eviscerated leaving an open cavity 15 and a skin flap 16. The backbone of the turkey extends along the bottom portion of the carcass in FIG. 7. The backbone is not shown in FIG. 7. As is well known, the backbone of the turkey has side portions, not shown, which are accessible through the cavity 15 for anchoring the trussing retainers of the prior art as well as the trussing device of the present invention.

In the commercial processing of turkey and other poultry carcasses, the carcasses are commonly wrapped in a plastic case which is shrink wrapped around the carcass. If the exposed hocks 13 and 14 have sharp or jagged edges, the trussing devices of the prior art allow those sharp or jagged edges to protrude and possibly puncture the plastic packaging. This typically results in the loss of the carcass as a saleable item.

As shown best in FIG. 1, the trussing device 25 of the present invention has a protective cap means 30 which is designed to hold together and cover the exposed hocks 13 and 14 as shown best in FIG. 8. Protective cap means 30 has a generally flat top surface 31 and side walls 32 and 33 and end wall 34. The side walls 32 and 33, as well as end wall 34, extend downwardly from the top surface 31. Side walls 32 and 33 have sufficient length "$l_1$" to cover the sides of the exposed hocks as shown best in FIG. 6. Side walls 32 and 33 have a width "w" which is approximately ¾ of the overall vertical height of exposed hock 13. I have found that the side walls 32 and 33, and end wall 34, should preferably extend downwardly about ¾ of the height of the exposed hocks to form a sufficiently large surface to grip and enclose hocks 13 and 14 to hold them securely in position. If the side walls extend downwardly a greater distance, the trussing device will still perform its function, but it tends to protrude upwardly more than necessary.

End wall 34 has sufficient length "$l_2$" to cover the end portions of exposed hocks 13 and 14 as shown best in FIGS. 7 and 8. The thickness of the top surface and end walls as shown best in FIG. 5 is sufficiently large to resist being punctured by a sharp edge which may be present on an exposed hock and which might otherwise puncture a plastic wrap (not shown) which is typically applied by shrink wrapping. In the preferred embodiment, the material used is nylon and the thickness of the protective cap means is approximately 0.010 inches. This thickness also provides sufficient rigidity for the protective cap means 30 to retain its shape during and after shrink wrapping. Other materials than nylon may be utilized if approved by the United States Department of Agriculture for food products. The dimensions for "", 2 "1" and "w" will vary depending on the size of the turkey, or other fowl, being trussed.

The protective cap means 30 provides a relatively smooth three-dimensional continuous surface which grips and encloses the exposed hocks as shown best in FIG. 6. The side walls 32 and 33 are angularly disposed relative to each other as shown in FIG. 2. Side walls 32 and 33 form an angle of approximately 30°-45° relative to each other so as to accept the legs 11 and 12 when folded inwardly as shown in FIG. 8. Tab 39 is carried by protective cap means and facilitates the manipulation required to insert the hocks into the cap and to remove the hocks from the cap.

An anchor means 50 is provided which includes a bar 51 having curved and upwardly extending ends 52 and 53 for engaging the side portions of the turkey backbone. Tab 54 is carried by bar 51 to facilitate insertion and removal of the trussing device 25 from the cavity 15 of carcass 10.

Connecting means 60 is provided for connecting the protective cap means to the anchor means 50. Connecting means 60 includes a pair of straps 61 and 62 which extend from the ends of bar 51 to the protective cap means 30. Connecting strap 61 extends around the base of side wall 32 and to the center of end wall 34. Strap 62 extends along the bottom of side wall 33 and to the central portion of end wall 34.

In operation, the trussing device of this invention may be applied to the carcasses as quickly and easily as any device presently on the market. The trussing device of the present invention affords a positive and secure mechanism to hold the hocks together. The cap improves the appearance of the packaged poultry in that it hides the unattractive showing of hocks but, more importantly, it prevents any sharp or jagged edges of the exposed hocks from puncturing the plastic cover for the trussed carcass.

What is claimed is:

1. An apparatus for trussing a dressed and eviscerated poultry carcass, wherein the legs of said poultry carcass when dressed terminate in exposed hocks, and wherein the backbone and side portions of the backbone are exposed in the eviscerated cavity, comprising:
    a protective cap means for holding together and covering said exposed hocks, said protective cap means forming a smooth, three-dimensional continuous surface which grips and encloses said exposed hocks,
    anchor means removably connected to the side portions of the backbone of said poultry carcass, and
    connecting means for connecting said protective cap means to said anchor means.

2. The apparatus of claim 1 wherein said protective cap means forms a generally rigid surface which holds its shape when a shrink wrapping is applied over said carcass and cap.

3. The apparatus of claim 2 wherein said protective cap means comprises:
    a generally flat top surface having sufficient length and width to cover the tops of said exposed hocks,
    two side walls extending downwardly from said top surface having sufficient length to cover the sides of said exposed hooks and having a sufficient width to cover approximately ¾ of the vertical height of said exposed hocks, and
    an end wall extending downwardly from said top surface having sufficient length to cover the ends of said exposed hocks and having a sufficient width to cover approximately ¾ of the vertical height of said exposed hocks.

4. The apparatus of claim 3 wherein said side walls are oriented at an angle of between 30° and 45° with respect to each other.

5. The apparatus of claim 1 wherein said protective cap means is made of nylon and is sufficiently thick to resist being punctured by a sharp edge which may be present on one of said exposed hocks.

* * * * *

UNITED STATES PATENT OFFICE
CERTIFICATE OF CORRECTION

Patent No. 5,451,182    Dated September 19, 1995

Inventor(s) Henry J. Volk

It is certified that error appears in the above-identified patent and that said Letters Patent is hereby corrected as shown below:

Col. 2, line 57; "12" should be ---"$l_2$"---

Col. 3, lines 3-5; change the sentence "The dimensions for "", 2 "l" and "w" will vary depending on the size of the turkey, or other fowl, being trussed." to read --- The dimensions for "$l_1$", "$l_2$" and "w" will vary depending on the size of the turkey, or other fowl, being trussed. ---

Signed and Sealed this

Fourteenth Day of November, 1995

*Attest:*

BRUCE LEHMAN

*Attesting Officer*   *Commissioner of Patents and Trademarks*